US012641682B2

(12) United States Patent
(10) Patent No.: US 12,641,682 B2
(45) Date of Patent: May 26, 2026

Matsumoto

(54) SUBSTRATE TRANSFER APPARATUS AND SUBSTRATE TRANSFER METHOD

(71) Applicant: TOKYO ELECTRON LIMITED, Tokyo (JP)

(72) Inventor: Wataru Matsumoto, Yamanashi (JP)

(73) Assignee: Tokyo Electron Limited, Tokyo (JP)

( * ) Notice: Subject to any disclaimer, the term of this patent is extended or adjusted under 35 U.S.C. 154(b) by 876 days.

(21) Appl. No.: 17/976,280

(22) Filed: Oct. 28, 2022

(65) Prior Publication Data

US 2023/0143372 A1 May 11, 2023

(30) Foreign Application Priority Data

Nov. 5, 2021 (JP) ................................ 2021-180835

(51) Int. Cl.
*H05B 1/02* (2006.01)
*B08B 7/00* (2006.01)
*H01L 21/67* (2006.01)

(52) U.S. Cl.
CPC ........... *H05B 1/0233* (2013.01); *B08B 7/005* (2013.01); *B08B 7/0071* (2013.01)

(58) Field of Classification Search
CPC . B08B 7/005; B08B 7/0071; H01L 21/67109; H01L 21/67115; H01L 21/67173; H01L 21/6719; H01L 21/67196; H01L 21/67265; H01L 21/67709; H01L 21/67742; H01L 21/67748; H01L 21/67784; H05B 1/0233; H05B 3/0047; H05B 6/10
USPC ....... 219/648, 658, 647, 650, 652, 653, 654, 219/655; 156/345.32, 626.1, 626.2; 118/719, 666, 708, 712, 715
See application file for complete search history.

(56) References Cited

U.S. PATENT DOCUMENTS 10,418,258 B2 9/2019 Nonaka
10,807,128 B2 10/2020 Furukawa
2004/0020601 A1* 2/2004 Zhao .................. H01L 21/6719 156/345.32
2011/0139611 A1* 6/2011 Kim .................. H01L 21/67201 118/719
2014/0311728 A1 10/2014 Nonaka
(Continued)

FOREIGN PATENT DOCUMENTS

JP H07-117848 A 5/1995
JP H07-117849 A 5/1995
(Continued)

*Primary Examiner* — Quang T Van
(74) *Attorney, Agent, or Firm* — Fenwick & West LLP

(57) ABSTRACT

An apparatus for transferring a substrate to a substrate processing chamber is provided. The apparatus includes: a substrate transfer chamber having a floor provided with a first magnet and a sidewall connected to the substrate processing chamber and having an opening through which a substrate is loaded into and unloaded from the substrate processing chamber; a substrate transfer module including a substrate holder configured to hold the substrate and a second magnet having a repulsive force against the first magnet, and configured to move in the substrate transfer chamber by magnetic levitation using the repulsive force; and a heating device configured to heat the substrate transfer module to release contaminants adhered to a surface of the substrate transfer module.

17 Claims, 12 Drawing Sheets

(56) References Cited

U.S. PATENT DOCUMENTS

| | | | |
|---|---|---|---|
| 2016/0218029 | A1 | 7/2016 | Janakiraman et al. |
| 2019/0084014 | A1 | 3/2019 | Furukawa |

FOREIGN PATENT DOCUMENTS

| | | | |
|---|---|---|---|
| JP | H07-122617 | A | 5/1995 |
| JP | 2005-101539 | A | 4/2005 |
| JP | 2005-311631 | A | 11/2005 |
| JP | 2008-034858 | A | 2/2008 |
| JP | 2009-302185 | A | 12/2009 |
| JP | 2013-026387 | A | 2/2013 |
| JP | 2013-128005 | A | 6/2013 |
| JP | 2018-504784 | A | 2/2018 |
| KR | 10-2007-0036237 | A | 4/2007 |
| KR | 10-2019-0033003 | A | 3/2019 |
| WO | WO 2016/118335 | A1 | 7/2016 |

* cited by examiner

SUBSTRATE TRANSFER APPARATUS AND SUBSTRATE TRANSFER METHOD

CROSS-REFERENCE TO RELATED APPLICATIONS

This application claims priority to Japanese Patent Application No. 2021-180835 filed on Nov. 5, 2021, the entire contents of which are incorporated herein by reference.

TECHNICAL FIELD

The present disclosure relates to a substrate transfer apparatus and a substrate transfer method.

BACKGROUND

For example, in an apparatus (wafer processing apparatus) for processing a semiconductor wafer (hereinafter, also referred to as "wafer") that is a substrate, a wafer is transferred between a carrier accommodating wafers and a wafer processing chamber for processing a wafer. Various types of wafer transfer mechanisms are used for transferring wafers.

The applicants of the present disclosure are developing a wafer processing apparatus for transferring a substrate using a substrate transfer module that utilizes magnetic levitation.

In the wafer processing apparatus, small amounts of various contaminants such as particles generated by the contact between a wafer and a device or between devices, chemical substances used during wafer processing, and the like exist in a space where a wafer is transferred. When these contaminants are adhered to and accumulated on the substrate transfer module, a wafer to be transferred is contaminated.

For example, Japanese Laid-open Patent Publication No. 2005-101539 discloses a technique for increasing temperatures of members constituting a stage on which a substrate to be processed is placed and the like in a decompression processing apparatus and scattering particles by thermal stress and thermophoretic force. On the other hand, Japanese Laid-open Patent Publication No. 2005-101539 does not disclose a method for dealing with the contamination of the substrate transfer module that utilizes magnetic levitation.

SUMMARY

The present disclosure provides a technique for cleaning a substrate transfer module that utilizes magnetic levitation to transfer a substrate.

In accordance with one aspect of the present disclosure, an apparatus for transferring a substrate to a substrate processing chamber is provided. The apparatus comprises: a substrate transfer chamber having a floor provided with a first magnet and a sidewall connected to the substrate processing chamber and having an opening through which a substrate is loaded into and unloaded from the substrate processing chamber; a substrate transfer module including a substrate holder configured to hold the substrate and a second magnet having a repulsive force against the first magnet, and configured to move in the substrate transfer chamber by magnetic levitation using the repulsive force; and a heating device configured to heat the substrate transfer module to release contaminants adhered to a surface of the substrate transfer module.

BRIEF DESCRIPTION OF THE DRAWINGS

The objects and features of the present disclosure will become apparent from the following description of embodiments, given in conjunction with the accompanying drawings, in which.

DETAILED DESCRIPTION

<Wafer Processing System>

Hereinafter, a configuration of an apparatus for transferring a substrate according to an embodiment of the present disclosure will be described with reference to FIG. 1. The apparatus for transferring a substrate is disposed in a wafer processing system 101.

Figure 1:
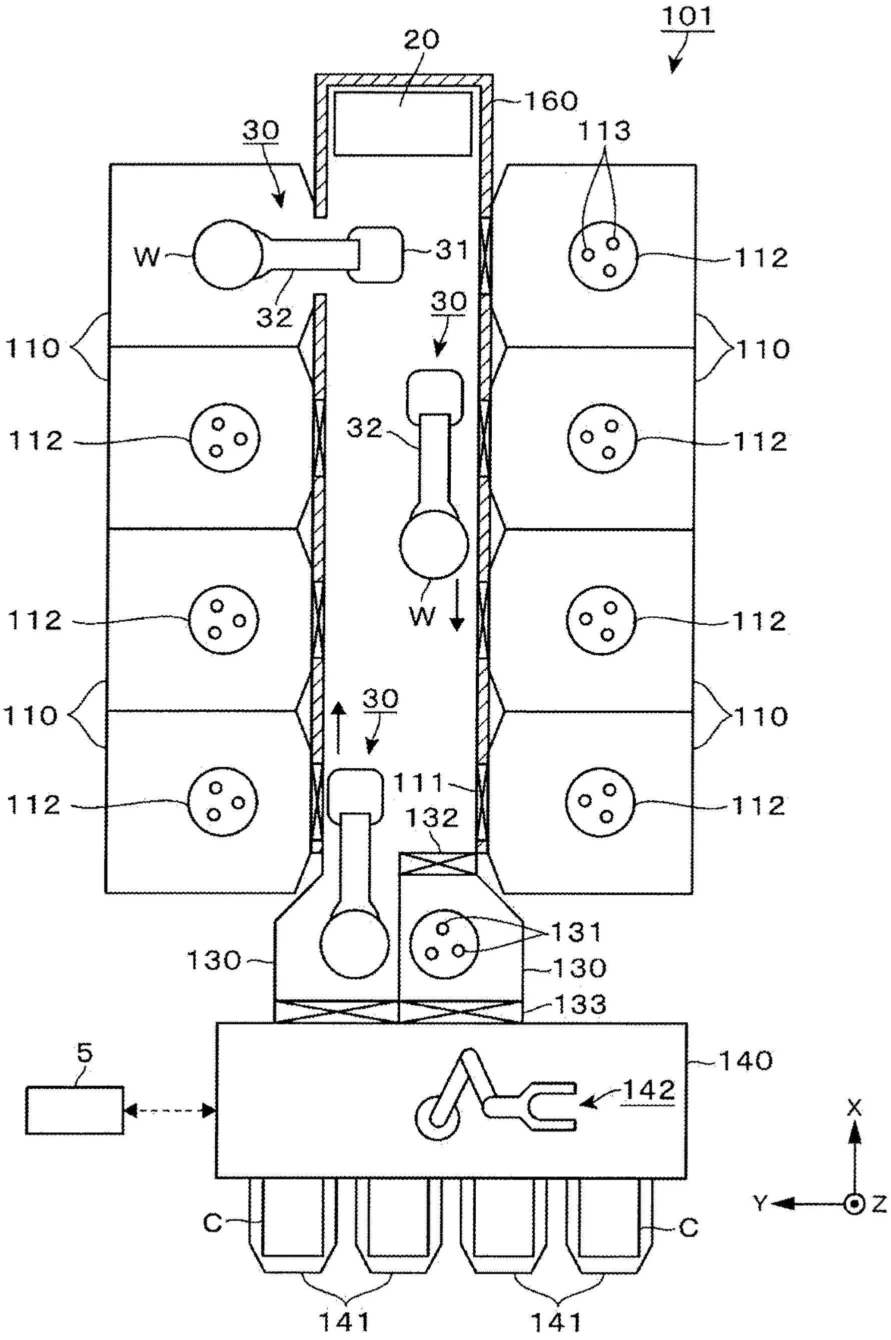
FIG. 1 is a plan view showing a first configuration example of a wafer processing system.

FIG. 1 shows the multi-chamber type wafer processing system 101 including a plurality of wafer processing chambers 110 that are substrate processing chambers for processing wafers W. As shown in FIG. 1, the wafer processing system 101 includes load ports 141, an atmospheric transfer chamber 140, load-lock chambers 130, a vacuum transfer chamber 160, and the plurality of wafer processing chambers 110. In the following description, a side on which the load ports 141 are arranged is set to a front side.

In the wafer processing system 101, the load ports 141, the atmospheric transfer chamber 140, the load-lock chambers 130, and the vacuum transfer chamber 160 are arranged in a horizontal direction in that order from the front side. The plurality of wafer processing chambers 110 are arranged side by side on the left and right sides of the vacuum transfer chamber 160 when viewed from the front side.

Each of the load ports 141 is configured as a placing table on which a carrier C accommodating wafers W to be processed is placed. Four load ports 141 are arranged side by side in the left-right direction when viewed from the front side. A front opening unified pod (FOUP) or the like can be used as the carrier C, for example.

The atmospheric transfer chamber 140 has an atmospheric pressure (normal pressure) atmosphere. For example, down-flow of clean air is formed in the atmospheric transfer chamber 140. A wafer transfer mechanism 142 for transferring the wafer W is disposed in the atmospheric transfer chamber 140. The wafer transfer mechanism 142 in the atmospheric transfer chamber 140 is configured as a multi joint arm, for example. The wafer transfer mechanism 142 transfers the wafer W between the carriers C and the load-lock chambers 130. An alignment chamber (not shown) for alignment of the wafer W is disposed on the left side of the atmospheric transfer chamber 140, for example.

Two load-lock chambers 130, for example, are arranged side by side between the vacuum transfer chamber 160 and the atmospheric transfer chamber 140. Each of the load-lock chambers 130 has lift pins 131 for lifting and holding the wafer W loaded thereinto. For example, three lift pins 131 configured to be raised and lowered are disposed at equal intervals along a circumferential direction. Lift pins 113 and 143 to be described later have the same configuration.

The inner atmospheres of the load-lock chambers 130 can be switched between an atmospheric pressure atmosphere and a vacuum atmosphere. The load-lock chambers 130 and the atmospheric transfer chamber 140 are connected through gate valves 133. Further, the load-lock chambers 130 and the vacuum transfer chamber 160 are connected through gate valves 132.

The vacuum transfer chamber 160 corresponds to the substrate transfer chamber of the present disclosure. As shown in FIG. 1, the vacuum transfer chamber 160 is configured as a rectangular housing elongated in a forward-backward direction in plan view. The vacuum transfer chamber 160 is evacuated to a vacuum atmosphere by a vacuum exhaust mechanism (not shown). Further, an inert gas supply device (not shown) for supplying an inert gas (e.g., nitrogen gas) may be connected to the vacuum transfer chamber 160 and constantly supply the inert gas into the vacuum transfer chamber 160 that has been decompressed. In the wafer processing system 101 shown in the example of FIG. 1, four wafer processing chambers 110 are connected to the right sidewall of the vacuum transfer chamber 160 through gate valves 111, and other four wafer processing chambers 110 are connected to the left sidewall of the vacuum transfer chamber 160 through other gate valves 111. The wafers W are loaded and unloaded between the vacuum transfer chamber 160 and the wafer processing chambers 110 through openings that are opened and closed by the gate valves 111.

Each wafer processing chamber 110 is evacuated to a vacuum atmosphere by a vacuum exhaust mechanism (not shown). A placing table 112 is disposed in each wafer processing chamber 110, and the wafer W is placed on the placing table 112 and subjected to predetermined processing. The processing to be performed on the wafer W may include etching, film formation, cleaning, ashing, or the like.

For example, in the case of performing processing while heating the wafer W, the placing table 112 is provided with a heater. When the processing to be performed on the wafer W uses a processing gas, the wafer processing chamber 110 is provided with a processing gas supply device including a shower head or the like. The illustration of the heater and the processing gas supply device is omitted. Further, the placing table 112 is provided with the lift pins 113 for transferring the wafer W to be loaded/unloaded. The wafer processing chamber 110 corresponds to the substrate processing chamber of the present embodiment.

<Transfer Module 30>

In the vacuum transfer chamber 160 configured as described above, the wafer W is transferred using the magnetic levitation type transfer module (substrate transfer module) 30. The transfer module 30 shown in the example of FIGS. 2 and 3 includes a main body 31 having a rectangular shape in plan view. The main body 31 is provided with an arm portion 32 for holding the wafer W horizontally. The arm portion 32 is disposed to extend in the horizontal direction from a base end portion on the main body 31 side. A fork is disposed at a tip end of the arm portion 32 to surround a region where three lift pins 131 and 113 are disposed from both sides thereof. The fork corresponds to a substrate holder in the transfer module 30.

The arm portion 32 has a length that allows the wafer W to be transferred onto the placing table 112 when the main body 31 is located in the vacuum transfer chamber 160 and the arm portion 32 enters the wafer processing chamber 111 by opening the gate valve 111.

Module-side magnets 33 are disposed in the main body 31 of the transfer module 30. A configuration example thereof will be described later with reference to FIG. 3.

<Magnetic Levitation Mechanism>

Figure 3:
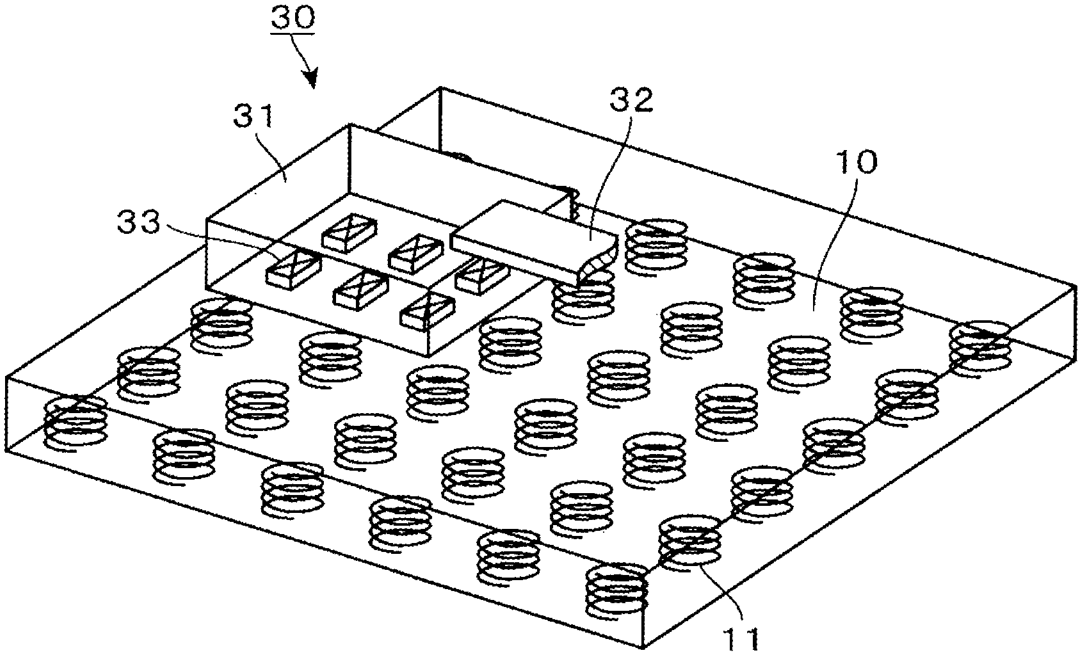
FIG. 3 is a perspective view showing a configuration example of a transfer module and tiles.

As schematically shown in FIG. 3, a plurality of tiles (moving tiles) 10 are disposed on the floor of the vacuum transfer chamber 160. The tiles 10 are disposed in the movement area of the transfer module 30 that extends from the position (position facing the load-lock chambers 130) where the wafer W is transferred to and from the external atmospheric transfer chamber 140 to the front side of the wafer processing chamber 110. When the transfer area is set such that the transfer module 30 enters the load-lock chamber 130 or the wafer processing chamber 110 and moves therein, the tiles 10 are also disposed on the floor of the load-lock chamber 130 or the wafer processing chamber 110.

A plurality of moving surface-side coils 11 are arranged in each tile 10. The moving surface-side coils 11 generates a magnetic field when a power is supplied from a power supply device (not shown). The moving surface-side coils 11 correspond to first magnets of the present disclosure.

On the other hand, the plurality of module-side magnets 33 that are permanent magnets, for example, are arranged in the transfer module 30. A repulsive force (magnetic force) acts against the module-side magnets 33 by the magnetic field generated by the moving surface-side coils 11. Accordingly, the transfer module 30 can be magnetically levitated with respect to the moving surface on the upper surface side of the tile 10. The module-side magnets 33 disposed in the transfer module 30 correspond to second magnets of the present disclosure.

The tile 10 can change the magnetic field state by adjusting the position where the magnetic field is generated or the strength of the magnetic force using the moving surface-side coils 11. By controlling the magnetic field, it is possible to move the transfer module 30 in a desired direction on the moving surface, adjust the levitation distance from the moving surface, and adjust the direction of the transfer module 30. The magnetic field on the tile 10 side is controlled by selecting the moving surface-side coils 11 to which the power is supplied or by adjusting the magnitude of the power supplied to the moving surface-side coils 11.

The module-side magnets 33 may include coils that receive a power from a battery disposed in the transfer module 30 and function as electromagnets. The module-side magnets 33 may include both a permanent magnet and a coil.

In the example shown in FIGS. 1 and 3, the length in the short side direction of the rectangular vacuum transfer chamber 160 in plan view allows two transfer modules 30 arranged side by side and holding the wafers W to move without interference. The length in the short side direction of the vacuum transfer chamber 160 of this example is shorter than the length (the entire length of the transfer module 30 holding the wafer W) from the main body 31 to the tip end of the wafer W held by the transfer module 30. In this example, the wafers W are transferred using the plurality of transfer modules 30 disposed in the vacuum transfer chamber 160.

The vacuum transfer chamber 160 including the transfer module 30 and connected to the wafer processing chambers 110, which has been described above, corresponds to the substrate transfer apparatus of the present disclosure.

<Controller 5>

The wafer processing system 101 includes a controller 5. The controller 5 is a computer having a CPU and a storage device, and controls individual components of the wafer processing system 101. The storage device stores a program including a group of steps (commands) for controlling the movement of the transfer module 30, the operation of the wafer processing chambers 110, or the like. The program is stored in a storage medium such as a hard disk, a compact disk, a magneto-optical disk, a memory card, a non-volatile memory, or the like, and installed in the computer from the storage medium.

<Transfer Operation of Wafer W>

Next, an example of an operation of transferring the wafer W in the wafer processing system 101 configured as described above will be described. First, when the carrier C accommodating wafers W to be processed is placed on the load port 141, a wafer W is taken out from the carrier C by the wafer transfer mechanism 142 in the atmospheric transfer chamber 140. Then, the wafer W is transferred to the alignment chamber (not shown) and aligned. When the wafer W is taken out from the alignment chamber by the wafer transfer mechanism 142, the gate valve 133 is opened.

When the wafer transfer mechanism 142 enters the load-lock chamber 130, the lift pins 131 are lifted to receive the wafer W. Then, the wafer transfer mechanism 142 retracts from the load-lock chamber 130, and the gate valve 133 is closed. The inner atmosphere of the load-lock chamber 130 is switched from an atmospheric pressure atmosphere to a vacuum atmosphere.

When the load-lock chamber 130 has a vacuum atmosphere, the gate valve 132 is opened. At this time, in the vacuum transfer chamber 160, the transfer module 30 stands by near the connection position with the load-lock chamber 130 while facing the load-lock chamber 130. The transfer module 30 is raised by magnetic levitation using the magnetic field generated by the moving surface-side coils 11 disposed in the tile 10.

Then, as shown in FIG. 1, the arm portion 32 of the transfer module 30 enters the load-lock chamber 130 and is positioned below the wafer W supported by the lift pins 131. The lift pins 131 are lowered to transfer the wafer W to the fork of the arm portion 32.

Next, the arm portion 32 holding the wafer W retracts from the load-lock chamber 130, and the transfer module 30 retracts to a lateral position of the wafer processing chamber 110 for processing the wafer W. At this time, the main body 31 of the transfer module 30 is moved to the rear end side of the vacuum transfer chamber 160 while passing through the area where the gate valve 111 is located. Accordingly, the tip end side of the arm portion 32 holding the wafer W is disposed at the lateral side of the gate valve 111.

When the tip end side of the arm portion 32 reaches the lateral side of the gate valve 111, the transfer module 30 retracts and also revolves such that the tip end side of the arm portion 32 faces the gate valve 111. Then, the gate valve 111 is opened, and the transfer module 30 revolves to transfer the wafer W into the wafer processing chamber 110 and changes its movement direction to the forward direction.

As described above, the length in the short side direction of the vacuum transfer chamber 160 is shorter than the entire length of the transfer module 30 holding the wafer W. Even in this case, the wafer W can be transferred from the vacuum transfer chamber 160 into the wafer processing chamber 110 in by the operation of moving the transfer module 30 forward/backward while rotating the transfer module 30.

Next, when the transfer module 30 faces the wafer processing chamber 110, the transfer module 30 stops rotation and moves straight until the wafer W reaches a position above the placing table 112. Then, the wafer W is transferred to the placing table 112 and the transfer module 30 retracts from the wafer processing chamber 110. Then, the gate valve 111 is closed, and the processing of the wafer W is started.

In other words, the wafer W placed on the placing table 112 is heated, if necessary, to a preset temperature, and the processing gas is supplied into the wafer processing chamber 110, if the processing gas supply device is provided. In this manner, desired processing is performed on the wafer W.

After the wafer W is processed for a preset period of time, the heating of the wafer W is stopped and the supply of the processing gas is stopped. The wafer W may be cooled by supplying a cooling gas into the wafer processing chamber 110, if necessary. Then, the wafer W is transferred in the reverse order of the loading operation, and returned from the wafer processing chamber 110 to the load-lock chamber 130.

After the inner atmosphere of the load-lock chamber 130 is switched to the atmospheric pressure atmosphere, the wafer W in the load-lock chamber 130 is taken out by the wafer transfer mechanism 142 in the atmospheric transfer chamber 140 and returned to a predetermined carrier C.

<Release of Contaminants>

In the wafer processing system 101 configured as described above, particles may be generated by the contact between devices during the opening/closing operation of the gate valves 132 and 111, for example. In addition, molecules of the processing gas supplied into the wafer processing chamber 110 may enter the vacuum transfer chamber 160 while being adsorbed to the wafer W and then released from the wafer W. The molecules of the processing gas may react with a small amount of moisture that exists in the vacuum transfer chamber 160 or is adsorbed on device surfaces, thereby forming particles or corrosive substances.

As will be described later, the vacuum transfer chamber 160 is constantly evacuated, so that the particles or molecules (chemical substances) are discharged to the outside of the vacuum transfer chamber 160. Some of the particles or chemical substances may be adhered to the surface of the transfer module 30 before they are discharged from the vacuum transfer chamber 160.

The particles or chemical substances adhered to and accumulated on the surface of the transfer module 30 may re-scatter and contaminate the wafer W. As described above, the moisture adsorbed on the device surfaces may react with the chemical substances, thereby forming particles or corrosive substances. Therefore, the wafer processing system 101 of this example includes a mechanism for releasing contaminants such as particles, chemical substances, and moisture adhered to the surface of the transfer module 30. In the present disclosure, moisture is also included in the concept of "contaminants."

In the wafer processing system 101 illustrated in FIGS. 1 and 3, the mechanism for releasing contaminants is disposed in a cleaning area 20 set in the rear end portion of the vacuum transfer chamber 160. The rear end portion of the vacuum transfer chamber 160 serves as a space where the main body 31 enters in the case of performing the operation of loading/unloading the wafer W into/from the wafer processing chamber 110 located on the rearmost side when viewed from the load ports 141.

A heating device for heating the transfer module 30 to release contaminants from the surface of the transfer module 30 is disposed in the cleaning area 20. Hereinafter, various configuration examples of the heating device will be described with reference to FIGS. 5A to 8.

First Configuration Example of Heating Device: Heating Light Source 411

Figure 4:
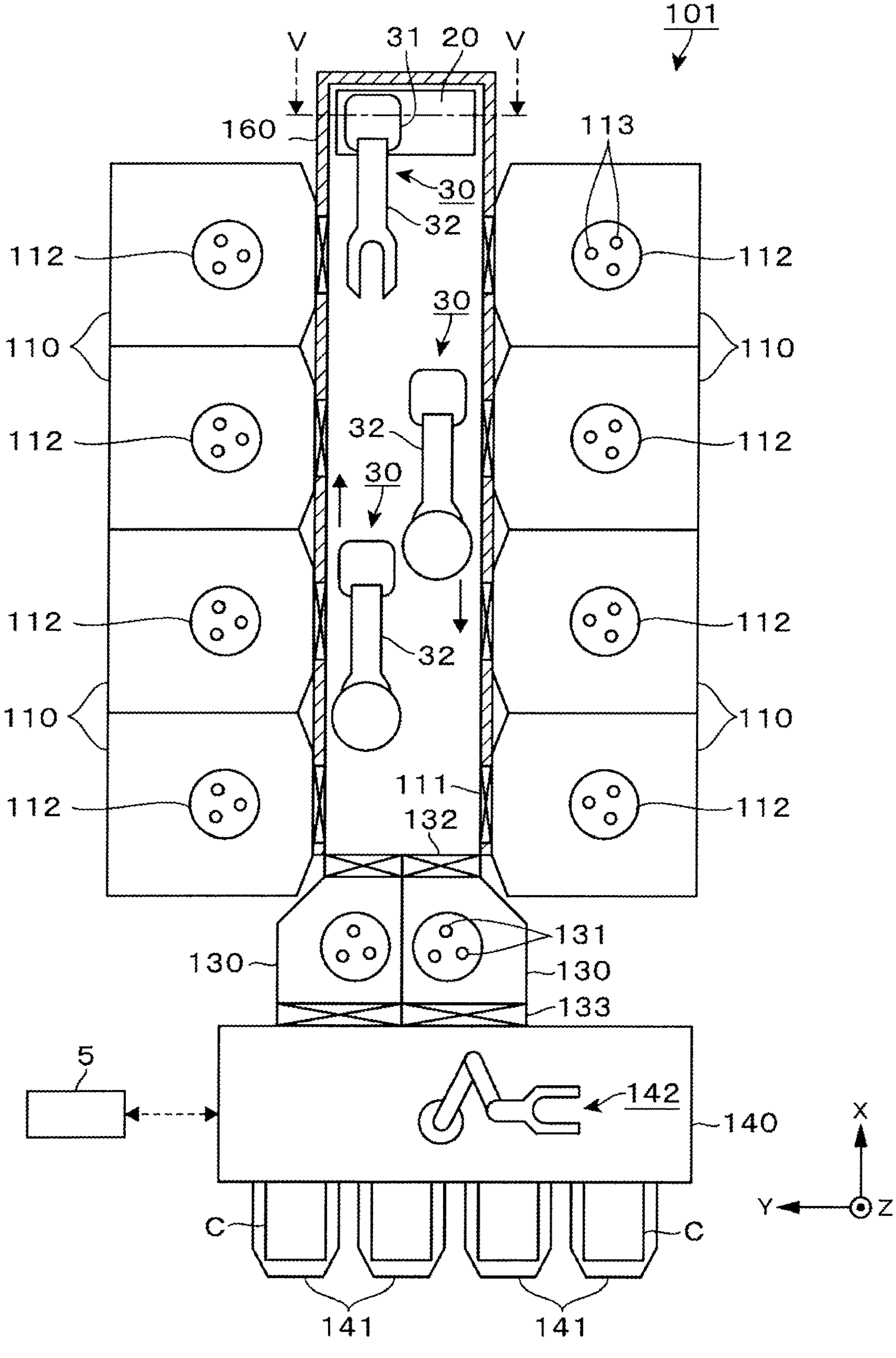
FIG. 4 is a plan view showing an operation example of the wafer processing system.
Figure 5A:
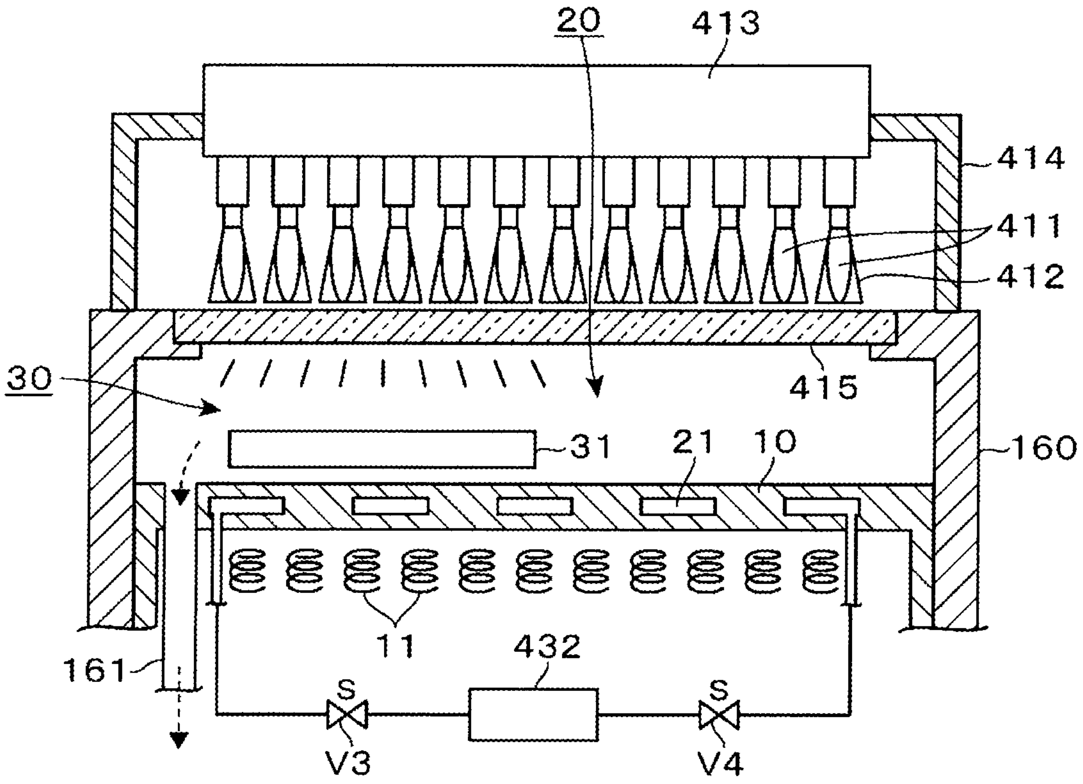
FIG. 5A is a first longitudinal cross-sectional view showing a first configuration example of a heating device.
Figure 5B:
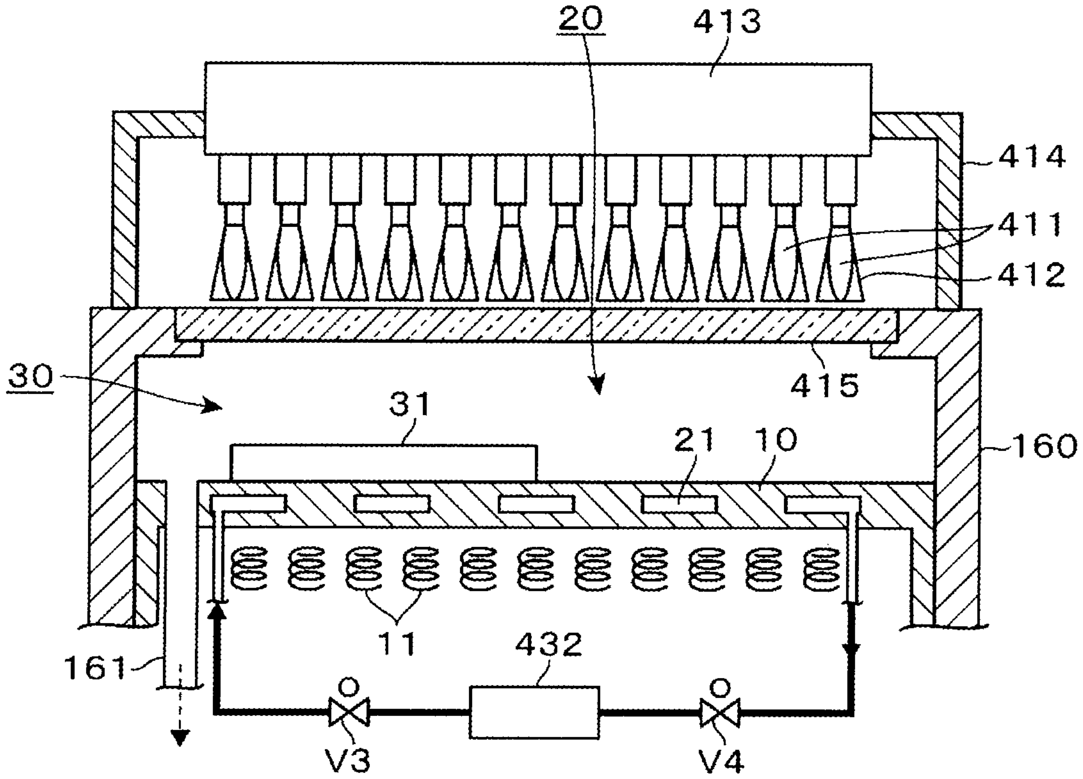
FIG. 5B is a second longitudinal cross-sectional view showing the first configuration example of the heating device.
Figure 6:
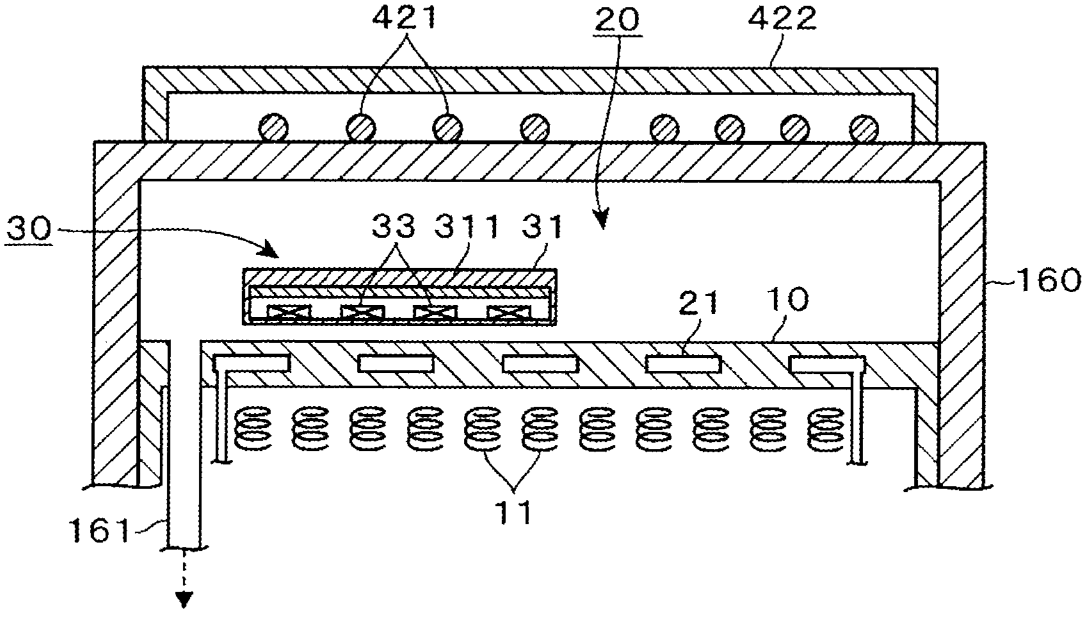
FIG. 6 is a longitudinal cross-sectional view showing a second configuration example of the heating device.
Figure 7A:
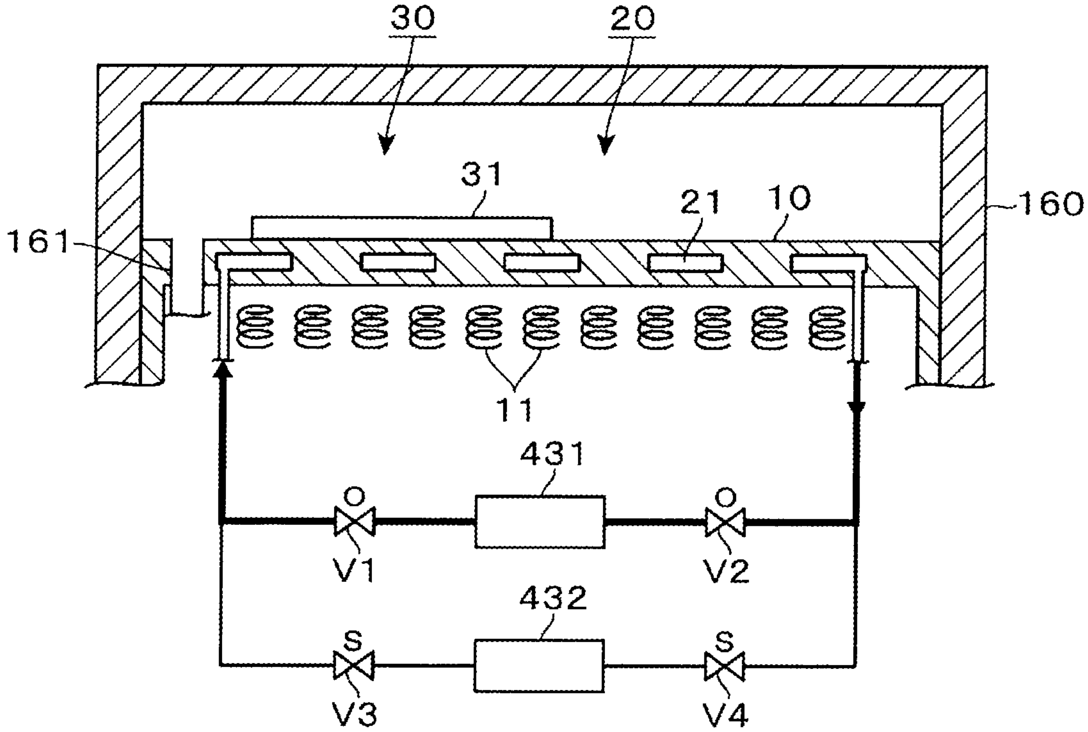
FIG. 7A is a first longitudinal cross-sectional view showing a third configuration example of the heating device.
Figure 7B:
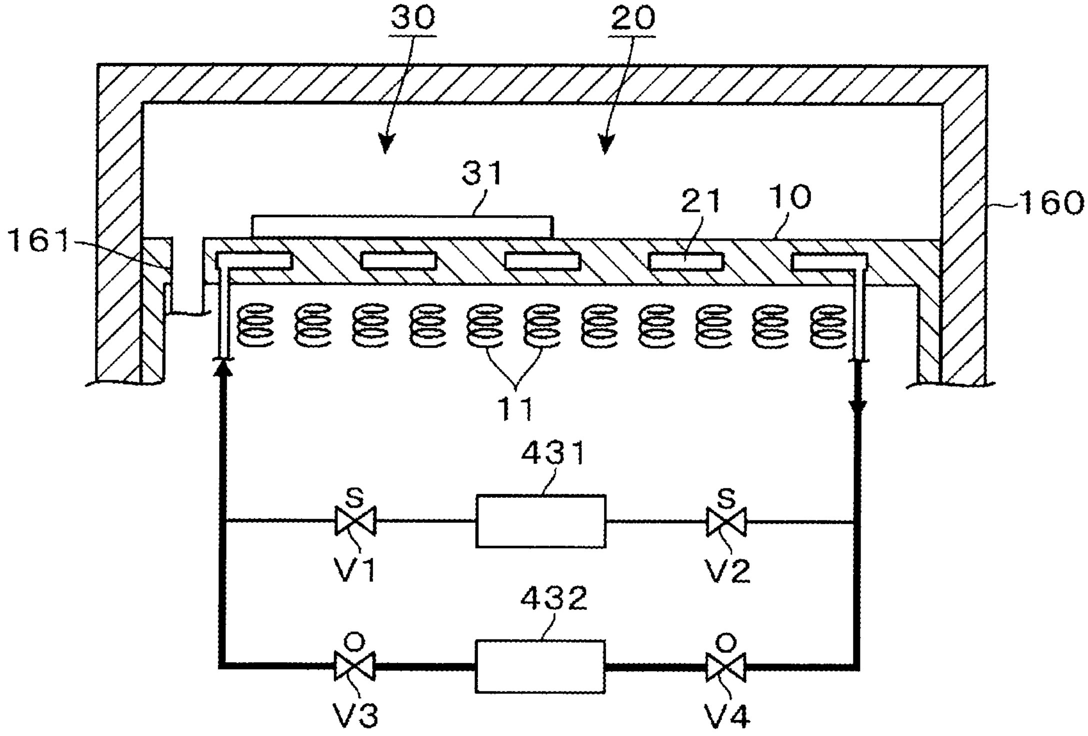
FIG. 7B is a second longitudinal cross-sectional view showing the third configuration example of the heating device.
Figure 8:
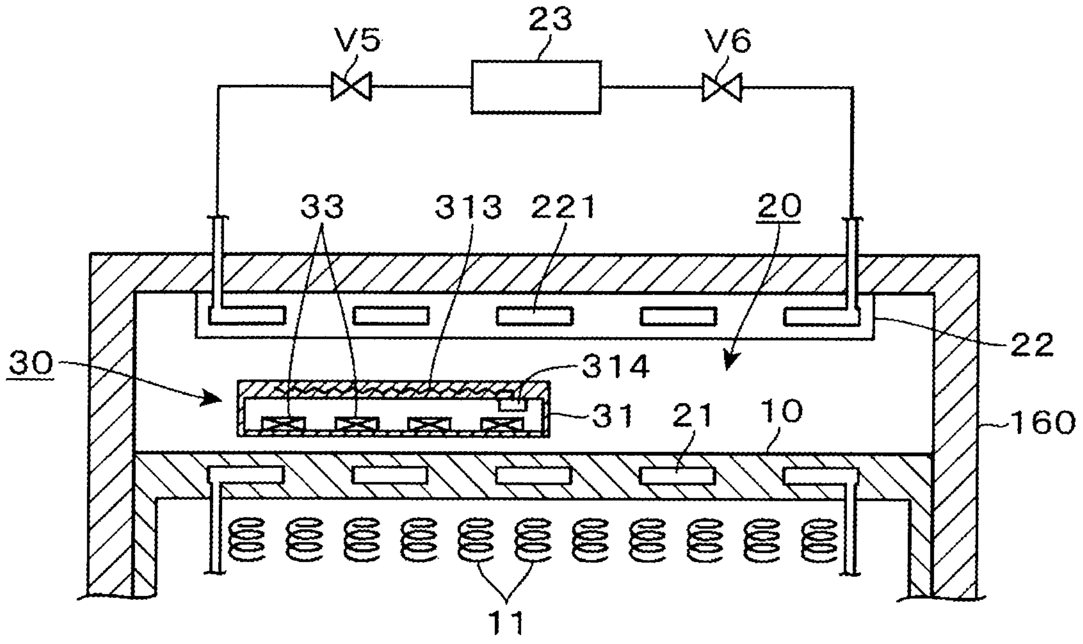
FIG. 8 is a longitudinal cross-sectional view showing a fourth configuration example of the heating device.

FIGS. 5A and 5B are longitudinal cross-sectional views of the vacuum transfer chamber 160 taken along line A-A' of FIG. 4 (the same in FIGS. 6 to 8).

As shown in FIG. 5A, a plurality of heating light sources 411 as a first configuration example of the heating device of the present disclosure is disposed at a ceiling portion of the vacuum transfer chamber 160 in the cleaning area 20. In this example, the heating light sources 411 are disposed on the upper surface side of the ceiling portion of the wafer processing system 101 to uniformly irradiate the cleaning area 20 with heating light for heating the surface of the transfer module 30. Further, the area irradiated with the heating light can be adjusted by selecting the heating light source 411 to which a power is supplied from the power supply device (not shown).

The heating light sources 411 may include an infrared lamp such as a halogen lamp, or a light emitting diode (LED) lamp that emits infrared light. Each heating light source 411 may be provided with a lamp shade 412 to control the irradiation direction of the heating light.

The heating light sources 411 are arranged on the upper surface side of the ceiling portion of the vacuum transfer chamber 160 via a cover portion 414 and a holding portion 413. A transmission window 415 made of quartz glass, for example, and transmitting the heating light is disposed between the area where the heating light sources 411 are arranged and the cleaning area 20 set in the vacuum transfer chamber 160.

FIGS. 5A and 5B show an example in which a cooling device for cooling the transfer module 30 heated by the heating light sources 411 to a use temperature. In this example, the cooling device has a configuration in which a channel (temperature control fluid channel 21) through which a coolant that is a temperature control fluid flows is formed in the tile 10. In this case, the upper surface of the tile 10 serves as a contact surface to be in contact with the main body 31. A coolant supply device 432 for supplying a coolant and stopping the supply of the coolant is connected to the temperature control fluid channel 21.

A heating operation for releasing contaminants from the surface of the transfer module 30 in the wafer processing system 101 configured as described above will be described.

When it is required to heat the transfer module 30, the main body 31 to be processed is moved to the cleaning area 20 and positioned below the heating light sources 411. In the examples shown in FIGS. 4, 5A, and 5B, one transfer module 30 is disposed. However, two transfer modules 30 may be arranged.

For example, the main body 31 may be heated after a preset period of time elapses from previous heating, or after a preset number of wafers W are transferred.

For convenience of description, FIG. 4 shows a state in which the transfer module 30 is disposed in the cleaning area 20 when the wafer W is transferred by another transfer module 30 in the vacuum transfer chamber 160. In practice, it is preferable to heat the transfer module 30 while the wafer W is not being transferred in the vacuum transfer chamber 160.

The period in which the wafer W is not transferred may include a period in which the wafer W is being processed in the wafer processing chamber 110 and there is a sufficient standby time, or a period in which all the wafers W are processed and there is no wafer W in the vacuum transfer chamber 160 or the wafer processing system 101.

After the transfer module 30 (the main body 31) is disposed in the cleaning area 20, the heating light sources 411 in the region facing the main body 31 are turned on in a state where the transfer module 30 is levitated as shown in FIG. 5A, and irradiate the heating light. Due to the irradiation of the heating light, the temperature of the surface of the main body 31 increases abruptly from room temperature. At this time, the surface of the main body 31 may be heated to a temperature in the range of 75° C. to 300° C., for example.

When the temperatures of the constituent members of the main body 31 or the particles adhered to the surfaces thereof increase abruptly, sudden thermal stress is applied to the main body 31 and, thus, a force that separates the particles from the surface of the main body 31 is applied. The force that separates particles from the surface of the main body 31 is also applied by the thermophoretic effect caused by a large temperature gradient between the surface of the main body 31 and the surrounding atmosphere. The particles adhered to the surface of the wafer W are released by such a force.

The chemical substances or moisture adhered to the surface of the wafer W is also decomposed or sublimated/vaporized by the heating of the main body 31, and released from the surface of the wafer W.

The temperature of the bottom surface of the main body 31, which is not irradiated with the heating light, also increases due to heat conduction from the upper surface. At this time, the heating is performed in a state where the main body 31 is levitated from the floor of the vacuum transfer chamber 160, so that particles or chemical substances are released from the bottom surface of the main body 31 by the above-described mechanism.

The surface of the arm portion 32 connected to the main body 31 also increases due to heat conduction, and particles or chemical substances are released from the surface thereof.

The heating light sources 411 may be disposed to irradiate the heating light to the upper surface of the arm portion 32. Alternatively, after the main body 31 is heated, the arm portion 32 may enter the cleaning area 20 by changing the direction of the transfer module 30 and the main body 31 may be directly heated.

Here, as shown in FIG. 5A, one end of an exhaust channel 161 constituting an exhaust device for evacuating the vacuum transfer chamber 160 may be opened on the floor of the area where the cleaning area 20 is disposed. When the cleaning area 20 is set in the vacuum transfer chamber 160, it is considered that the exhaust channel 161 constitutes the exhaust device for exhausting the atmosphere in which the transfer module 30 is heated.

Particles or chemical substances (contaminants) released from the surface of the transfer module 30 are discharged to the outside of the vacuum transfer chamber 160 through the exhaust channel 161. Therefore, the exhaust channel 161 also functions as a contaminant removal device for removing contaminants released from the surface of the transfer module 30.

As described above, when the inert gas is constantly supplied into the vacuum transfer chamber 160, the supply flow rate of the inert gas may be increased during the heating of the transfer module 30 to facilitate evacuation. In this case, the pressure in the vacuum transfer chamber 160 may increase. Hence, the effect of pressure variation can be avoided by adjusting the processing schedule or the transfer schedule and heating the transfer module 30 during the period in which the wafer W is not transferred.

The transfer module 30 is heated for a preset time and the irradiation of the heating light from the heating light sources 411 is stopped when the surface of the main body 31 becomes clean. Then, the coolant is supplied from the coolant supply device 432 to the temperature control fluid channel 21, and the transfer module 30 is lowered to bring the bottom surface of the transfer module 30 into contact with the tile 10 located in the region to which the coolant is supplied. When the bottom surface of the main body 31 is brought into contact with the surface (contact surface) of the cooled tile 10, the entire transfer module 30 (the top and bottom surfaces of the main body 31 and the arm portion 32) is cooled by heat conduction. Accordingly, even in the vacuum transfer chamber 160 that is being evacuated, the transfer module 30 can be quickly cooled to room temperature, for example, and the transfer of the wafer W can be resumed.

If the coolant is supplied to the temperature control fluid channel 21 even during the heating of the transfer module 30, the scattered contaminants may be attracted and adhered to the surface of the cooled tile 10 by a thermophoretic force. Therefore, the coolant is not supplied during the heating of the transfer module 30 to avoid contamination of the tile 10 and suppress re-contamination of the transfer modules 30 in contact with the tile 10 during the cooling.

Second Configuration Example of Heating Device: Induction Coil 421

FIG. 6 shows an example in which the induction coil 421 for induction heating is disposed, as a second configuration example of the heating device of the present disclosure, on the upper surface side of the ceiling portion of the vacuum transfer chamber 160. The induction coil 421 is covered with the cover portion 422. The induction coil 421 generates a magnetic field in a region below the induction coil 421 in the vacuum transfer chamber 160 by the power supplied from the power supply device (not shown).

The upper surface of the main body 31 that faces the induction coil 421 when the main body 31 is disposed in the cleaning area 20 is made of metal. When the power is supplied from the power supply device to the induction coil 421 and a magnetic field is formed in the vacuum transfer chamber 160, the temperature of the upper surface of the main body 31 increases due to induction heating. The heating temperature of the main body 31 and the release of contaminants (particles or chemical substances) from the surface of the transfer module 30 (the upper and bottom surfaces of the main body 31 and the arm portion 32) are the same as those described with reference to FIG. 5A. Further, the cooling of the transfer module 30 by the contact with the tile 10 through which the coolant flows after the release of contaminants through the exhaust channel 161 or the release of the contaminants is the same as that described with reference to FIGS. 5A and 5B, so that the redundant description thereof will be omitted.

When it is difficult to levitate the transfer module 30 during the heating using the induction coil 421, the transfer module 30 may be heated while being supported by a plurality of support pins, for example.

Third Configuration Example of Heating Device: Heat Exchange Mechanism

FIG. 7A shows an example in which a heat medium supply device 431 for supplying a heat medium that is a temperature control fluid to the temperature control fluid channel 21 formed in the tile 10 is provided as a heating device. In this case, while the heat medium is being supplied from the heat medium supply device 431, the surface of the transfer module 30 is heated to a temperature in the range of 75° C. to 300° C. by heat conduction due to the contact between the main body 31 and the upper surface (contact surface) of the tile 10 (see FIG. 7A). The tile 10 in which the temperature control fluid channel 21 is formed or the heat medium supply device 431 corresponds to the heat exchange mechanism of this example.

Then, the transfer module 30 is heated for a preset time. When the surface of the main body 31 becomes clean, the heat medium is switched and the transfer module 30 is cooled by supplying the coolant from the coolant supply device 432 (see FIG. 7B).

Fourth Configuration Example of Heating Device: Resistance Heating Element 313

FIG. 8 shows an example in which the resistance heating element 313 is disposed, as a heating device, in the transfer module 30. Further, a power supply device for supplying a power to the resistance heating element 313 is disposed in the transfer module 30. The resistance heating element 313 may be a secondary battery, for example. In this case, the main body 31 may be provided with a plug for connection to an external power source, and the secondary battery may be charged by inserting the plug into a socket. Alternatively, the secondary battery may be charged by wireless power supply.

In addition, the power may be directly supplied to the resistance heating element 313 by a plug-socket mechanism or wireless power supply without providing a secondary battery in the main body 31. In this case, the plug or a power receiving part for wireless power supply corresponds to the power supply device 314.

The resistance heating element 313 and the power supply device 314 correspond to the heating device of this example.

The contaminants can be released from the surface of the transfer module 30 by heating the transfer module 30 to a temperature in the range of 75° C. to 300° C. using the above-described resistance heating element 313. The cooling of the transfer module 30 by the contact with the tile 10 through which the coolant flows is the same as that described in the example of FIG. 5B.

FIG. 8 shows an example of a technique for removing contaminants released from the transfer module 30 that is different from a technique for discharging contaminants through the exhaust channel 161. In other words, a contaminant collecting member 22 having therein a coolant channel 221 is disposed at the ceiling portion of the vacuum transfer chamber 160 of this example, for example. The coolant supply device 23 is connected to the coolant channel 221, so that the coolant that is a temperature control fluid can be supplied to the coolant supply device 23.

Due to the coolant, the temperature of the surface of the contaminant collecting member 22 is adjusted to be lower than the temperature of the transfer module 30 heated by the resistance heating element 313. The contaminants released from the surface of the transfer module 30 are transferred toward the contaminant collecting member 22 by a thermophoretic force generated by the temperature gradient between the surface of the transfer module 30 and the surface of the contaminant collecting member 22, and adhered to the surface of the contaminant collecting member 22. Accordingly, the contaminants released from the transfer module 30 can be removed from the vacuum transfer chamber 160. The contaminant collecting member 22 corresponds to the contaminant removal device of this example.

Here, either one or both of the contaminant removal device using the exhaust channel 161 shown in FIGS. 5A to 7B and the contaminant removal device using the contaminant collecting member 22 shown in FIG. 8 may be selected, if necessary, and arranged. On the other hand, in the example shown in FIG. 5A, 5B, or 6, the heating device (the heating light sources 411 or the induction coil 421) is disposed at the ceiling portion of the vacuum transfer chamber 160. In this case, the contaminant collecting member 22 may be disposed on the sidewall of the vacuum transfer chamber 160, for example.

<Effect>

The wafer processing system 101 of the present disclosure provides the following effect. The heating device (the heating light sources 411, the induction coil 421, the coolant supply device 432, the temperature control fluid channel 21, or the resistance heating element 313 in the main body 31) heats the surface of the transfer module 30 that utilizes magnetic levitation to transfer the wafer W. The particles adhered to the surface of the wafer W can be released by the thermal stress and the thermophoretic force generated by the heating. The chemical substance adhered to the surface of the wafer W can be decomposed or sublimated by the heating of the main body 31 and released from the surface of the wafer W. The transfer module 30 can be cleaned by releasing the contaminants adhered to the surface thereof.

<Wafer Processing System 101*a*>

Figure 9:
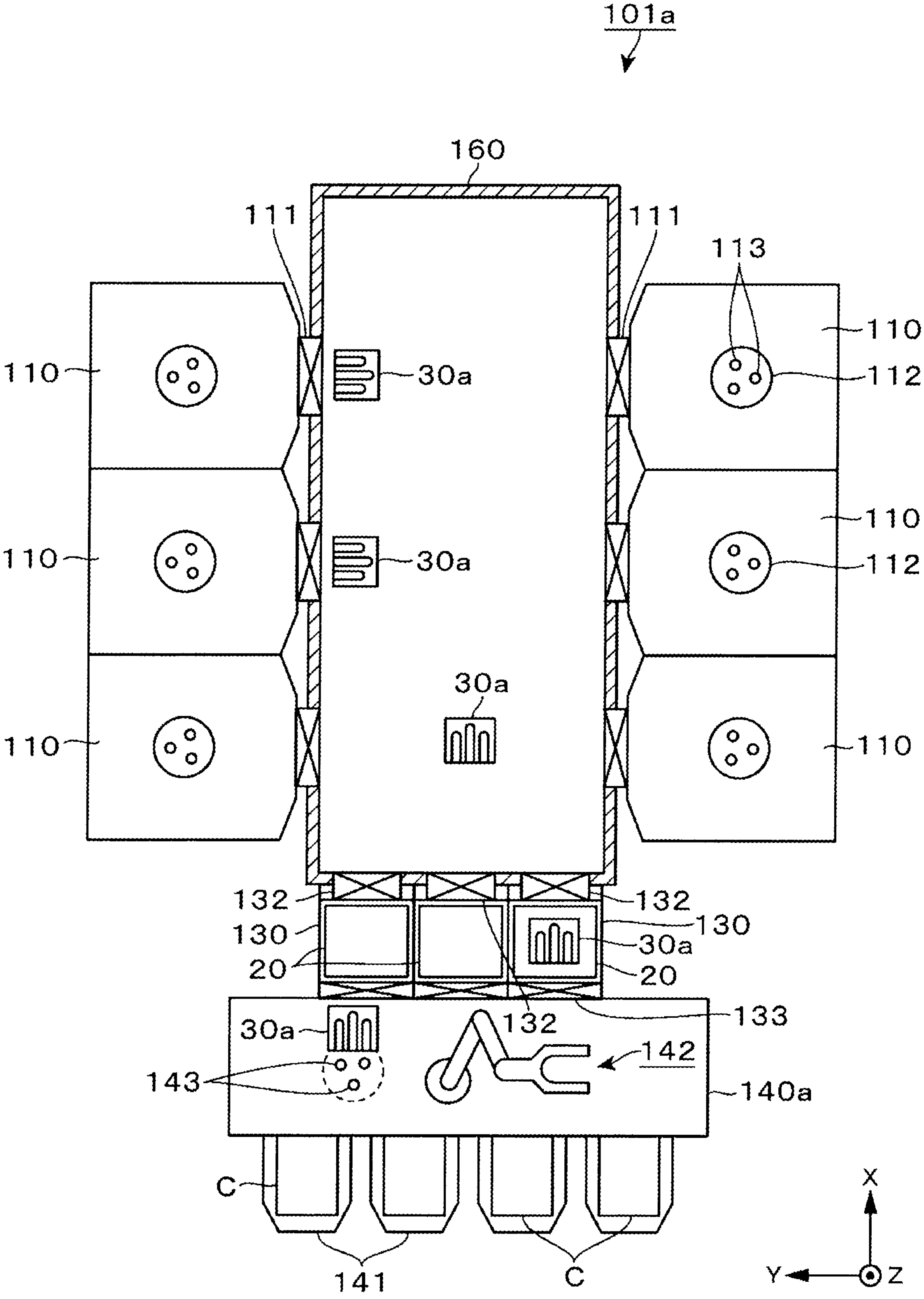
FIG. 9 is a plan view showing a second configuration example of the wafer processing system.

Next, the modification of the location of the cleaning area 20 and the timing of heating a transfer module 30*a* will be described with reference to an example of the wafer processing system 101*a* shown in FIG. 9. In FIGS. 9 to 12 to be described below, like reference numerals will be given to like parts in the wafer processing system 101 and transfer module 30 described with reference to FIGS. 1 to 8.

In the wafer processing system 101*a* shown in FIG. 9, the cleaning areas 20 are located in the load-lock chambers 130 for switching a pressure because the wafer W is loaded/unloaded between the vacuum transfer chamber 160 and the atmospheric transfer chamber 140. Hence, the wafer processing system 101*a* is different from the wafer processing system 101 shown in FIGS. 1 and 3 in that the transfer module 30 is heated in the vacuum transfer chamber 160.

In the wafer processing system 101*a*, the floors of the wafer processing chambers 110, the load-lock chambers 130, and the atmospheric transfer chamber 140 are located at substantially the same height as the floor of the vacuum transfer chamber 160. The tiles 10 having the moving surface-side coils 11 are also disposed on the floors thereof. Therefore, the transfer module 30*a* can be moved by magnetic levitation in the wafer processing chambers 110, the load-lock chambers 130, and the atmospheric transfer chamber 140. Hence, the wafer processing system 101*a* is different from that of the wafer processing system 101 shown in FIGS. 1 and 3 in that the arm portion 32 enters the wafer processing chamber 110 or the load-lock chamber 130 to transfer the wafer W.

In the atmospheric transfer chamber 140*a* of this example, the lift pins 143 are disposed on the floor thereof, and the wafer W is transferred to and from the wafer transfer mechanism 142 via the lift pins 143. The atmospheric transfer chamber 140*a* corresponds to "another substrate transfer chamber" of this example.

<Heating 1 in the Load-Lock Chamber 130>

Figure 10:
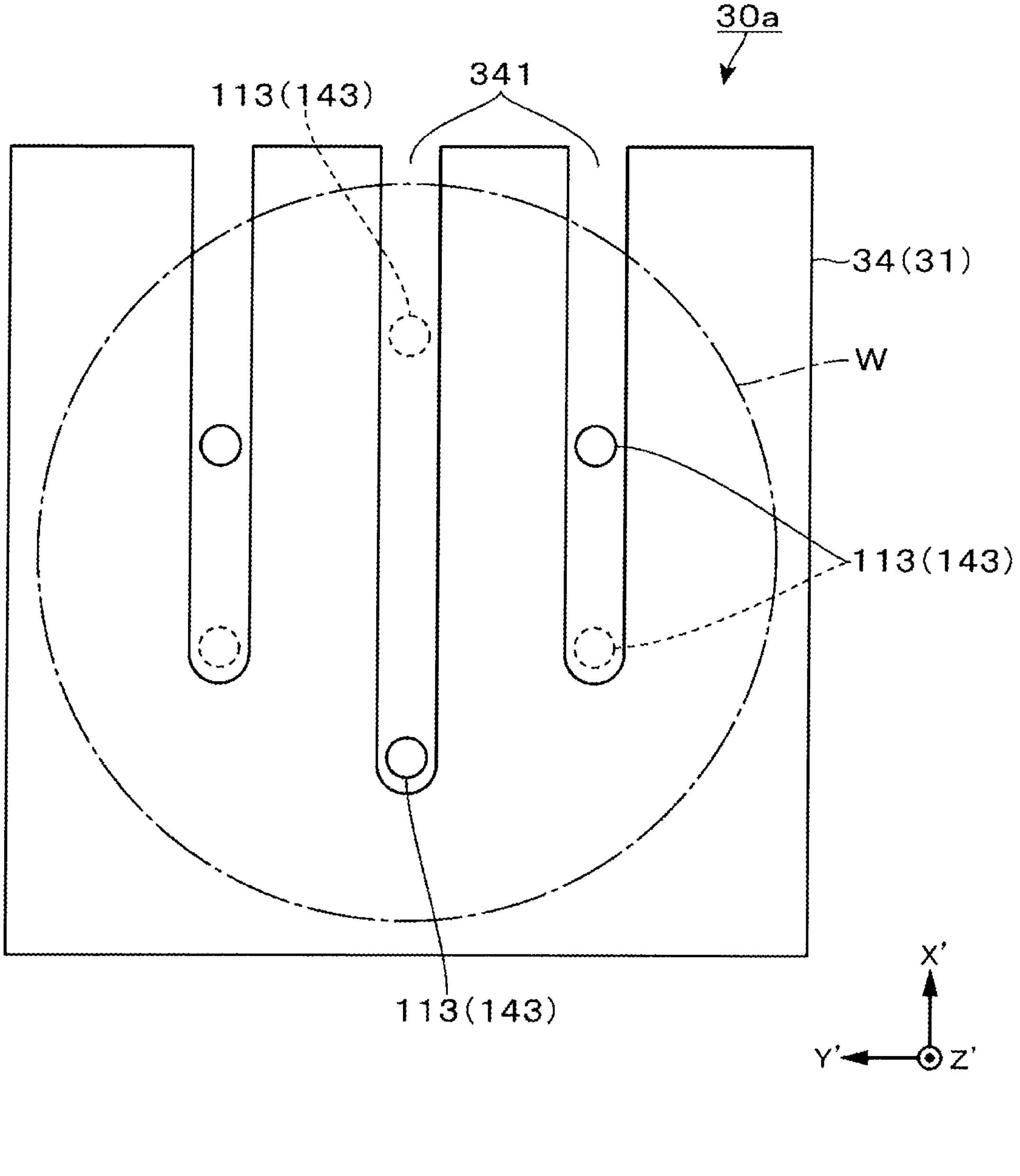
FIG. 10 is a plan view showing a second configuration example of the transfer module.

In the wafer processing system 101 of this example, the wafer W is transferred by the transfer module 30*a* that does not have the arm portion 32 so that it can easily enter the load-lock chamber 130 or the wafer processing chamber 110. As shown in FIG. 10, in the transfer module 30*a*, the wafer W is directly held on the upper surface of the main body 31. In other words, the main body 31 of the transfer module 30*a* serves as a stage 34 that is a substrate holder on which the wafer W is placed and held. For example, the stage 34 is formed in a flat rectangular plate shape.

The transfer module 30*a* enters the wafer processing chamber 110 or the atmospheric transfer chamber 140 to transfer the wafer W to and from the lift pins 113 and 143. The transfer module 30*a* has slits 341 for transferring the wafer W while avoiding interference with the lift pins 113 and 143. The slits 341 are formed along the path through which the lift pins 113 and 143 pass when the stage 34 is moved to and from the position below the wafer W held by the lift pins 113 and 143. The slits 341 are formed such that the direction of the wafer W at the time of moving the stage 34 to the position below the wafer W can be reversed by 180°. Accordingly, the transfer module 30*a* and the wafer W can be arranged concentrically in a vertical direction without interference between the transfer module 30*a* and the lift pins 113 and 143.

In the atmospheric transfer chamber 140 configured as described above, the transfer module 30*a* enters the atmospheric transfer chamber 140*a* via the load-lock chamber 130, receives an unprocessed wafer W from the lift pins 143, and transfers a processed wafer W to the lift pins 143. Although downflow of clean air is formed in the atmospheric transfer chamber 140*a* as described above, a relatively large amount of particles exist in the atmospheric transfer chamber 140*a* compared to the amount of particles in the vacuum transfer chamber 160 maintained in a vacuum atmosphere. In the atmospheric transfer chamber 140*a*, moisture tends to be adsorbed on the transfer module 30*a*. Further, the chemical substances adhered to the wafer W during the processing in the wafer processing chamber 110 may enter the atmospheric transfer chamber 140*a* and react with moisture in the atmosphere or moisture adsorbed on the transfer module 30*a* to form particles or corrosive chemical substances.

When the transfer module 30*a* is moved between the atmospheric transfer chamber 140*a* and the vacuum transfer chamber 160 having different cleanliness levels, contaminants or moisture may enter the vacuum transfer chamber 160 or the wafer processing chamber 110 by the movement of the transfer module 30*a*. Therefore, the contaminants are released by heating the transfer module 30*a* in the load-lock chamber 130 when the transfer module 30*a* is moved from the atmospheric transfer chamber 140*a* to the vacuum transfer chamber 160. In this case, it is preferable that the transfer module 30*a* is not transferring the wafer W. By heating the transfer module 30*a*, the transfer module 30*a* having a clean surface can enter the vacuum transfer chamber 160 or the wafer processing chamber 110.

<Heating 2 in the Load-Lock Chamber 130>

Figure 11:
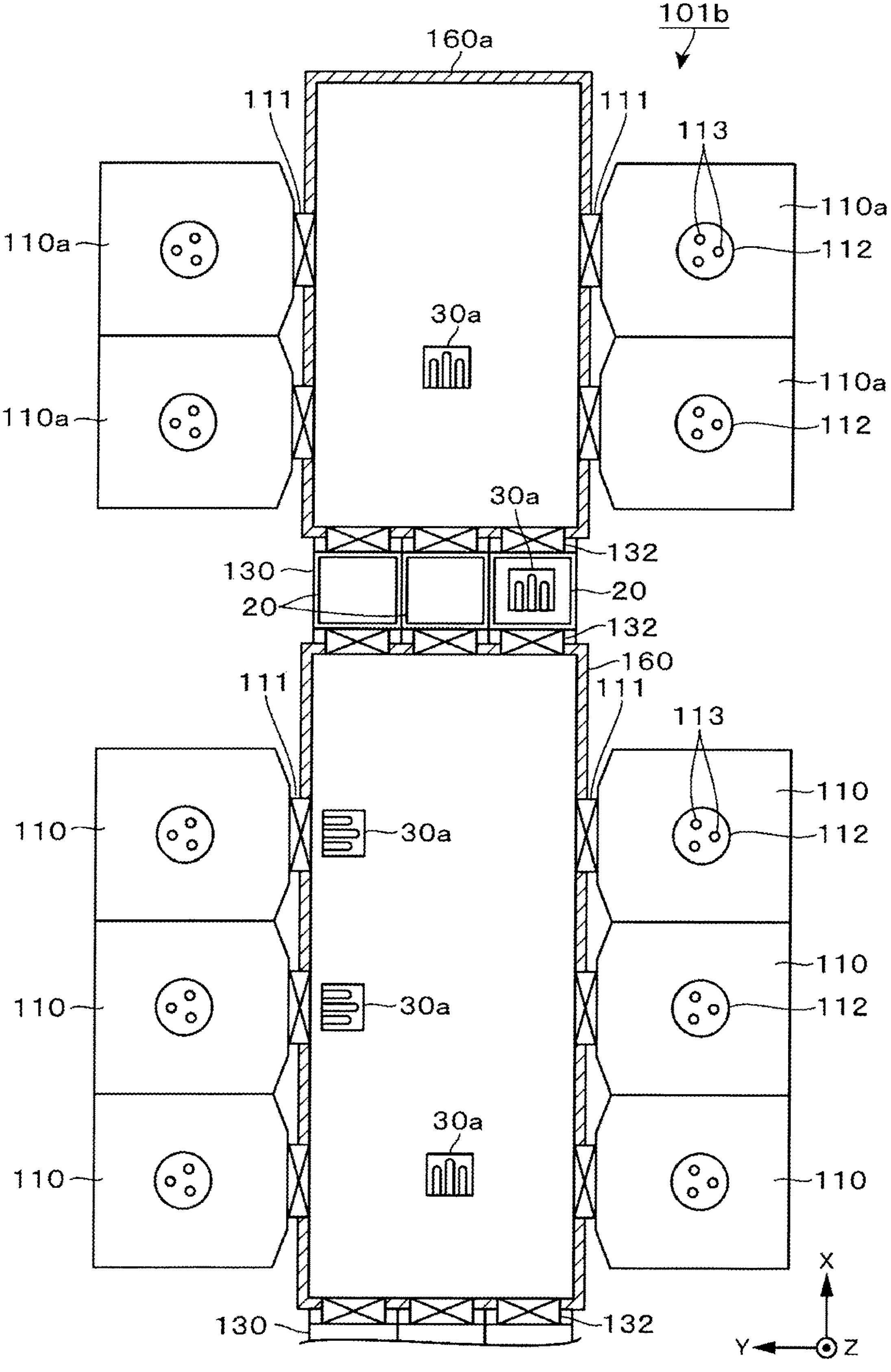
FIG. 11 is a plan view showing a third configuration example of the wafer processing system.

FIG. 11 shows a wafer processing system 101*b* in which vacuum transfer chambers 160 and 160*a* having different vacuum levels are connected via the load-lock chambers 130, and the cleaning areas 20 are located in the load-lock chambers 130. For example, the wafer processing 110*a* for performing physical vapor deposition (PVD) film formation requires a higher vacuum level compared to the wafer processing chamber 110 for performing chemical vapor deposition (CVD) film formation. Further, for example, the PVD film formation may be performed continuously after the CVD film formation. Therefore, in the wafer processing system 101*b* shown in FIG. 11, the CVD film formation and the PVD film formation can be consecutively performed by connecting the first vacuum transfer chamber 160 connected to the wafer processing chamber 110 for CVD and the second vacuum transfer chamber 160*a* connected to the wafer processing chamber 110*a* for PVD via the load-lock chambers 130.

On the other hand, the second vacuum transfer chamber 160*a* connected to the wafer processing chamber 110*a* for PVD film formation that requires a high vacuum level may require a higher cleanliness level compared to that in the first vacuum transfer chamber 160. Thus, in the wafer processing system 101*b* of this example, the cleaning areas 20 are located in the load-lock chambers 130 arranged between the first vacuum transfer chamber 160 and the second vacuum transfer chamber 160*a*. With this configuration, when the transfer module 30*a* is moved from the first vacuum transfer chamber 160 to the second vacuum transfer chamber 160*a*, the transfer module 30*a* can be heated in the load-lock chamber 130 and the contaminants can be released. In this case, it is preferable that the transfer module 30*a* is not transferring the wafer W. The transfer module 30*a* having a clean surface by heating the transfer module 30*a* can enter the second vacuum transfer chamber 160*a* or the wafer processing chamber 110*a* for performing PVD film formation.

The first vacuum transfer chamber 160 and the second vacuum transfer chamber 160*a* have substantially the same configuration except that they have different wafer processing chambers 110 and 110*a* connected to openings. Further, the processing of the wafer Win the wafer processing chambers 110 and 110*a* connected to the first and second vacuum transfer chambers 160 and 160*a* is not limited to a combination of PVD film formation and CVD film formation. For example, it is possible to perform an etching process in the wafer processing chamber 110*a* connected to the second vacuum transfer chamber 160*a* having a high vacuum level, and then perform the CVD film formation in the wafer processing chamber 110 connected to the first vacuum transfer chamber 160 having a low vacuum level.

In FIG. 11, the illustration of the load-lock chambers 130 arranged between the first vacuum transfer chamber 160 and the atmospheric transfer chamber 140*a* is omitted. Similarly to the wafer processing system 101*a* shown in FIG. 9, the cleaning areas 20 may be located in the load-lock chambers 130, and the transfer module 30*a* may be heated.

Referring to FIG. 11, the wafer processing chamber 110 may be connected to a transfer chamber maintained in an atmospheric atmosphere instead of the first vacuum transfer chamber 160. In this case, the second vacuum transfer chamber 160*a* is connected to the transfer chamber maintained in an atmospheric atmosphere through the load-lock chambers 130 where the cleaning areas 20 are located.

In the wafer processing systems 101*a* and 101*b* according to the examples of FIGS. 9 and 11, the heating device disposed in the cleaning area 20 may be any one of the heating light sources 411, the induction coil 421, the coolant supply device 432 and the temperature control fluid channel 21, and the resistance heating element 313 in the main body 31 described with reference to FIGS. 5A to 8. Further, the cooling device (the coolant supply device 432, the temperature control fluid channel 21, or the like) of the transfer module 30*a* may be disposed on the floors of the load-lock chambers 130. In addition, the exhaust device for exhausting the load-lock chambers 130 or the contaminant collecting member 22 may be provided as the contaminant removal device. When the contaminant removal device serves as the exhaust device, a vacuum exhaust channel for creating a vacuum atmosphere in the load-lock chamber 130 may be used.

Figure 2:
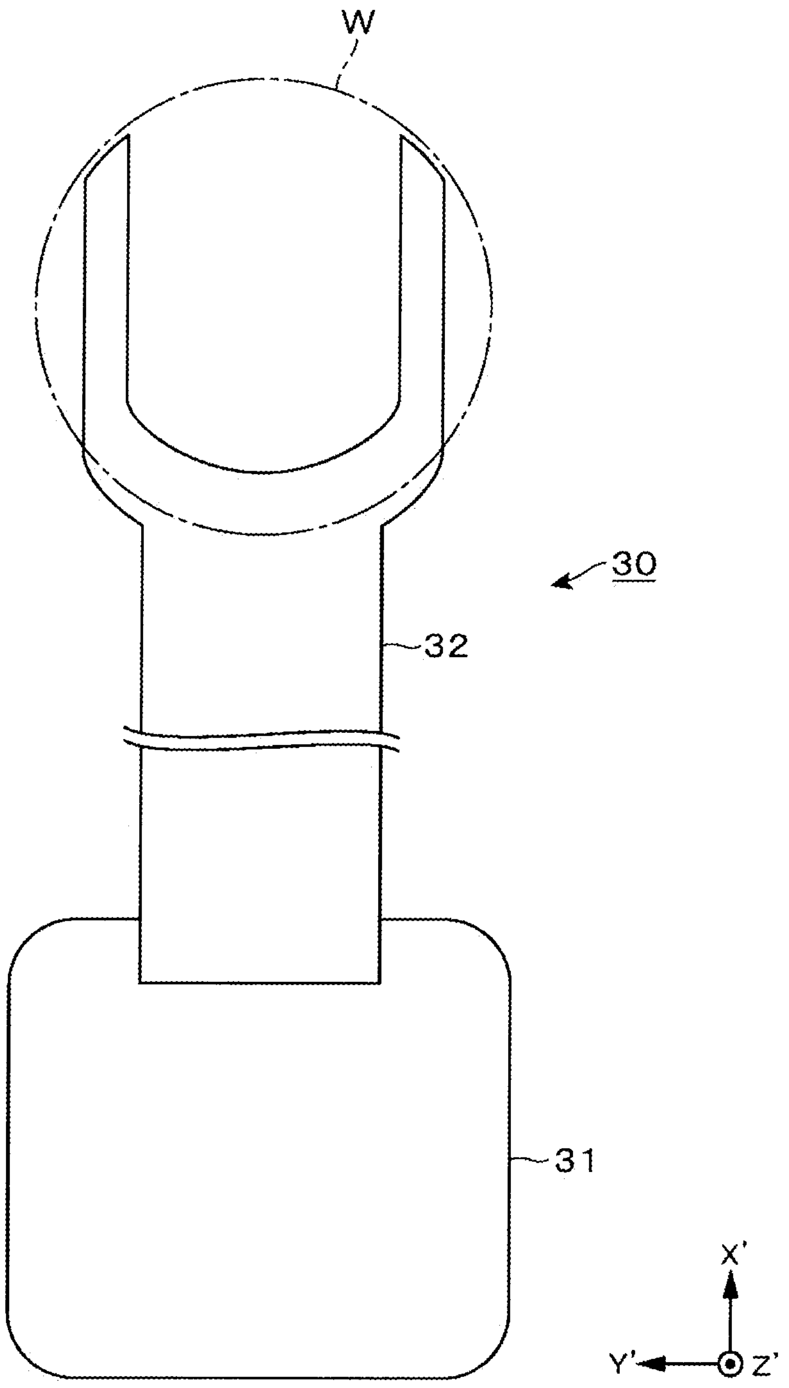
FIG. 2 is a plan view showing a first configuration example of a transfer module.

Also in the wafer processing systems 101*a* and 101*b* of the examples of FIGS. 9 and 11, the wafer W may be transferred using the transfer module 30 having the arm portion 32 shown in FIG. 2. In this case, the load-lock chambers 130 where the cleaning areas 20 are located have a size that allows the entire transfer module 30 having the arm portion 32 to be accommodated.

The heating of the transfer modules 30 and 30*a* is not necessarily performed in the vacuum transfer chamber 160 shown in FIGS. 1 and 4 or the load-lock chambers 130 shown in FIGS. 9 and 11. For example, a dedicated processing chamber for heating the transfer modules 30 and 30*a* may be connected to the rear end of the vacuum transfer chamber 160 through an opening that can be opened and closed by a shutter, and the cleaning areas 20 may be set in the dedicated processing chamber.

<Correction of Movement Control>

As described above, in each of the wafer processing systems 101, 101*a*, and 101*b*, the contaminants on the surface are released by heating the transfer modules 30 and 30*a* using the heating device (the heating light sources 411, the induction coil 421, the coolant supply device 432 and the temperature control fluid channel 21, or the resistance heating element 313 in the main body 31). On the other hand, it is known that the magnetic force of the module-side magnets 33 disposed in the transfer modules 30 and 30*a* decreases due to thermal demagnetization when the module-side magnets 33 are heated.

Figure 12:
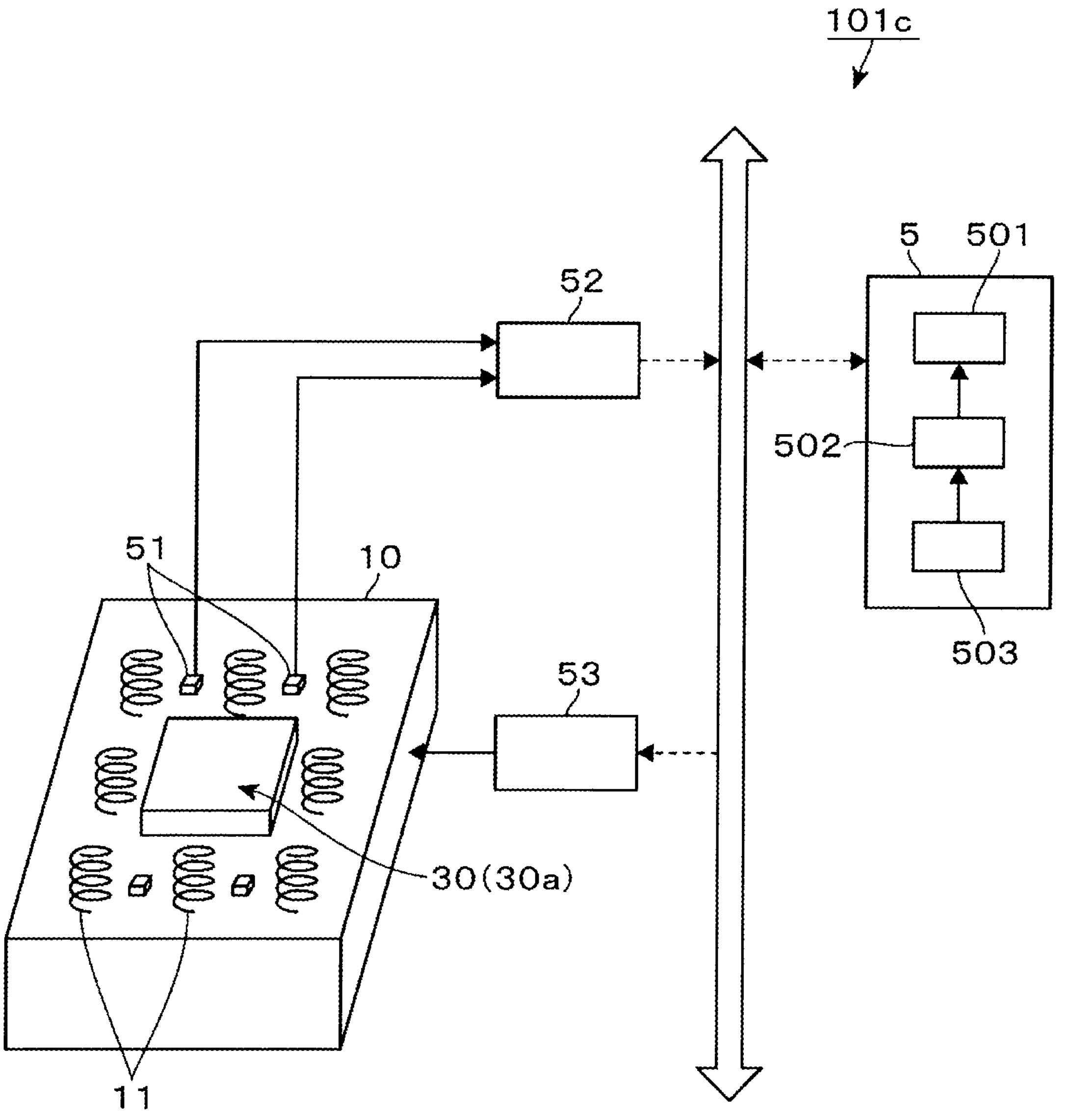
FIG. 12 is a block diagram showing a configuration example of a mechanism for correcting positional displacement caused by heating of the transfer module.

For example, FIG. 12 shows an example in which the movement of the transfer modules 30 and 30*a* is controlled using the function of a movement controller 501 of the controller 5. The movement controller 501 moves the transfer modules 30 and 30*a* to target position by selecting the moving surface-side coils 11 to which the power is supplied from the power supply device 53 or by adjusting the magnitude of the power supplied to the moving surface-side coils 11.

When the magnetic force of the module-side magnets 33 in the transfer modules 30 and 30*a* decreases, the repulsive force acting between the moving surface-side coils 11 and the module-side magnets 33 decreases. As a result, even if the moving surface-side coils 11 are selected in a preset order based on a recipe, and the movement control is performed by supplying a preset power to the moving surface-side coils 11, the transfer modules 30 and 30*a* may not reach the target positions.

Therefore, a wafer processing system 101*c* shown in FIG. 12 includes a position detector 52 for specifying the actual positions of the transfer modules 30 and 30*a* in the vacuum transfer chamber 160. A sensor for detecting the positions of the transfer modules 30 and 30*a* is disposed in the vacuum transfer chamber 160, and the position detector 52 specifies the positions of the transfer modules 30 and 30*a* based on the information obtained from the sensor.

The position detection sensor may include a plurality of Hall-effect sensors located at preset positions in the tile 10, a laser displacement meter, and a camera for imaging the positions of the transfer modules 30 and 30*a*. FIG. 12 shows an example in which the plurality of Hall-effect sensors 51 are disposed in the tile 10.

The controller 5 has the function of a displacement amount detector 503, and detects a positional displacement amount between the actual positions of the transfer modules 30 and 30*a* detected by the position detector 52 and the target positions where the module-side magnets 33 reach when thermal demagnetization does not occur. Since it is considered that the positional displacement amount is caused by thermal demagnetization of the magnetic force of the module-side magnets 33, the repulsive force between the moving surface-side coils 11 and the module-side magnets 33 controlled by the movement controller 501 is corrected to offset the positional displacement amount using the function of a corrector 502 of the controller 5.

The corrector 502 may correct the repulsive force using linear correction, for example. For example, when it is detected that the levitation heights (the position in the Z direction shown in FIG. 1) of the transfer modules 30 and 30*a* has decreased to 80% of the target heights due to thermal demagnetization, the corrector 502 corrects the control value outputted from the movement controller 501 such that the power supplied from the power supply device 53 to the moving surface-side coils 11 is increased by 1.25 times.

When the influence of the heat source increases and, thus, it is difficult to reduce the positional displacement amount even after the correction, an error may be issued by the wafer processing systems 101, 101*a* to 101*c*. When the error is issued, the original magnetic force may be restored by taking out the transfer modules 30 and 30*a* and magnetizing the module-side magnets 33 at the outside.

The embodiments of the present disclosure are illustrative in all respects and are not restrictive. The above-described embodiments may be omitted, replaced, or changed in various forms without departing from the scope of the appended claims and the gist thereof.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An apparatus for transferring a substrate to a substrate processing chamber for processing a substrate, comprising:

a substrate transfer chamber having a floor provided with a first magnet and a sidewall connected to the substrate processing chamber and having an opening through which a substrate is loaded into and unloaded from the substrate processing chamber;

a substrate transfer module including a substrate holder configured to hold the substrate and a second magnet having a repulsive force against the first magnet, and configured to move in the substrate transfer chamber by magnetic levitation using the repulsive force; and a heating device configured to heat the substrate transfer module to release contaminants adhered to a surface of the substrate transfer module.

2. The apparatus of claim 1, wherein the heating device is a heating light source that irradiates a surface of the substrate transfer module with heating light.

3. The apparatus of claim 1, wherein the heating device is an induction coil that heats the substrate transfer module made of a metal by induction heating.

4. The apparatus of claim 1, wherein the heating device is a heat exchange mechanism including a contact surface to be in contact with the substrate transfer module, a channel formed in a member forming the contact surface and through which a temperature control fluid flows, and a heat medium supply device configured to supply a heat medium that is the temperature control fluid to the channel.

5. The apparatus of claim 4, wherein the heat exchange mechanism includes a coolant supply device configured to supply a coolant, instead of the heat medium, as the temperature control fluid that cools the heated substrate transfer module to a use temperature.

6. The apparatus of claim 1, wherein the heating device is an internal heating mechanism including a resistance heating element disposed in the substrate transfer module, and a power supply device configured to supply a power to the resistance heating element.

7. The apparatus of claim 1, further comprising:

a cooling device configured to cool the substrate transfer module heated by the heating device to a use temperature.

8. The apparatus of claim 7, wherein the cooling device is a heat exchange mechanism including a contact surface to be in contact with the substrate transfer module, a channel formed in a member forming the contact surface and through which a temperature control fluid flows, and a coolant supply device configured to supply a coolant that is the temperature control fluid to the channel.

9. The apparatus of claim 1, further comprising:

a contaminant removal device configured to remove contaminants released from the surface of the substrate transfer module by the heating.

10. The apparatus of claim 9, wherein the contaminant removal device is an exhaust device configured to exhaust an atmosphere in which the substrate transfer module is heated by the heating device.

11. The apparatus of claim 9, wherein the contaminant removal device is a contaminant collecting member having a collecting surface that is controlled to a temperature lower than a temperature of the substrate transfer module heated by the heating device and collects the contaminants by a thermophoretic force.

12. The apparatus of claim 1, wherein the heating device is configured to heat the substrate transfer module in the substrate transfer chamber.

13. The apparatus of claim 1, further comprising:

a load-lock chamber in which a pressure is switched to load/unload a substrate between the substrate transfer chamber and another substrate transfer chamber having a pressure different from a pressure in the substrate transfer chamber, wherein the heating device is configured to heat the substrate transfer module in the load-lock chamber.

14. The apparatus of claim 13, wherein the substrate transfer chamber is configured as a vacuum substrate transfer chamber for transferring the substrate in a vacuum atmosphere, and said another substrate transfer chamber is an atmospheric transfer chamber having a floor provided with the first magnet and configured to transfer the substrate in an atmospheric atmosphere.

15. The apparatus of claim 13, wherein the substrate transfer chamber is a first vacuum substrate transfer chamber configured to transfer the substrate in a vacuum atmosphere, and said another substrate transfer chamber is a second vacuum substrate transfer chamber configured to transfer the substrate in a vacuum atmosphere having a vacuum level different from a vacuum level of the first vacuum substrate transfer chamber, said another substrate transfer chamber having a floor provided with a first magnet, and a sidewall connected to another substrate processing chamber configured to perform substrate processing different from substrate processing performed in the substrate processing chamber connected to the first vacuum substrate transfer chamber, the sidewall having an opening through which the substrate is loaded into and unloaded from said another substrate processing chamber.

16. The apparatus of claim 1, further comprising:

a movement controller configured to perform movement control of the substrate transfer module by changing the repulsive force between the first magnet and the second magnet;

a position detector configured to detect a position of the substrate transfer module moving on the floor;

a displacement amount detector configured to detect a positional displacement amount between a target position and an actual position of the substrate transfer module detected by the position detector in case of moving the substrate transfer module to the target position by performing the movement control using the movement controller, the positional displacement amount being caused by thermal demagnetization of a magnetic force of the second magnet due to the heating performed by the heating device; and a correction device configured to correct the repulsive force controlled by the movement controller to offset the displacement amount detected by the displacement amount detector.

17. A method for transferring a substrate in a substrate processing chamber, comprising:

transferring a substrate using a substrate transfer module accommodated in a substrate transfer chamber, the substrate transfer chamber having a floor provided with a first magnet and a sidewall connected to the substrate processing chamber and having an opening through which the substrate is loaded into and unloaded from the substrate processing chamber, the substrate transfer module including a substrate holder configured to hold a substrate and a second magnet having a repulsive force against the first magnet, the substrate transfer module being configured to move in the substrate transfer chamber by magnetic levitation using the repulsive force; and heating the substrate transfer module to release contaminants adhered to a surface of the substrate transfer module.

* * * * *